United States Patent [19]
Solyst

[11] 3,975,741
[45] Aug. 17, 1976

[54] CHARGE ELECTRODE FOR INK JET
[75] Inventor: Erik R. Solyst, San Jose, Calif.
[73] Assignee: International Business Machines Corporation, Armonk, N.Y.
[22] Filed: July 23, 1975
[21] Appl. No.: 598,482

[52] U.S. Cl. .................................... 346/75; 317/3
[51] Int. Cl.² ........................................ G01D 15/18
[58] Field of Search ............. 346/75; 317/3; 239/15

[56] References Cited
UNITED STATES PATENTS

| | | | |
|---|---|---|---|
| 3,586,907 | 6/1971 | Beam | 346/75 X |
| 3,604,980 | 9/1971 | Robertson | 346/75 X |
| 3,618,858 | 11/1971 | Culp | 346/75 X |

OTHER PUBLICATIONS
Baran et al., Fabrication of Ink Jet Charge Plates, IBM Tech. Disc. Bulletin, vol. 17, No. 6, Nov. 1974, pp. 1803–1804.

Primary Examiner—Joseph W. Hartary
Attorney, Agent, or Firm—John H. Holcombe

[57] ABSTRACT

A charge electrode structure for electrostatic ink jet systems comprises a series of dielectric laminates having planar electrode laminates therebetween and openings therethrough for passage of the ink jet stream approximately normal to the plane of the electrodes. The electrodes for the same stream are electrically interconnected and energizeble to form a charging field similar to that of a tubular charge electrode parallel to the stream.

17 Claims, 6 Drawing Figures

CHARGE ELECTRODE FOR INK JET

CROSS REFERENCE TO RELATED APPLICATION

"High Voltage Deflection Electrode Apparatus for Ink Jet," W. L. Chocholaty, application Ser. No. 543,851, filed Jan. 24, 1975.

BACKGROUND OF THE INVENTION

Electrostatic pressure ink jet systems are generally of one of two types. An example of one type is represented by Sweet U.S. Pat. No. 3,596,275 wherein pressurized electrically conductive fluid is ejected from a single nozzle as a fluid filament and perturbated for breaking into a stream of uniform drops. As each drop breaks off from its fluid filament, it may be selectively and variably charged by a charge field from a charge electrode. Th drops then pass through an electrostatic deflection field and are deflected from the normal path a distance which is related to the magnitude of the charges carried by the droplets. The droplets may then impact a recording medium at a location determined by the deflection distance. The other type of system is represented by Sweet et al. U.S. Pat. No. 3,373,437 wherein the pressurized electrically conductive fluid is ejected from a plurality of orifices and broken into plural streams of uniform drops. Again, as each drop breaks off from its fluid filament, it may be selectively charged by an associated charge electrode. Rather than variably charging the drops, this type of system operates binarily, giving a drop either a predetermined charge or leaving it in an uncharged condition. The drops then pass through an electrostatic deflection field, the charged drops being deflected thereby to a drop catcher or gutter, while the uncharged drops are undeflected and continue past the deflection field to impact a recording medium for printing.

The charge electrodes previously used comprise an electrically conductive material partially or wholly surrounding the corresponding ink jet stream and extending uniformly along the stream a distance of several drops. The reason for this is that the drop is charged in accordance with the field established by the charge electrode at the instant the drop breaks off from the filament, but the precise breakoff point can vary axially along the stream depending upon such factors as fluid viscosity and pressure. The field must be uniform along this axial distance so that the drops are properly charged without regard to the precise point of breakoff. For example, the charge electrode shown in Sweet U.S. Pat. No. 3,596,275 comprises an elongate ring or tube. In Sweet et al. U.S. Pat. No. 3,373,437, the charge electrode comprises a U-shaped channel.

Insertion of the ring or the channel electrodes into a supporting structure and then connecting the charge electrodes to a charging signal source is difficult and costly, especially in the multi-jet binary ink jet systems such as the Sweet et al. patent above.

Various attempts have been made to reduce difficulty and cost of forming tubular charge electrodes. One example is Beam et al. U.S. Pat. No. 3,586,907 which illustrates a charge ring plate provided with a series of holes and having a discrete application of an electrically conductive coating material surrounding each hole in circular outline and covering the wall thereof to form a charge ring. Also applied to the plate are a series of discrete lines of the electrically conductive coating material to form leads extending from each charge ring to a connector. This technique, also known as "through-hole plating" involves plating in several dimensions and exposes the charge electrode to contact with the mist or splash of the electrically conductive ink, which could result in electrical shorting.

Another example is represented by Robertson U.S. Pat. No. 3,604,980 which is formed from a dielectric support plate having a planar side surface placed alongside a plurality of streams and provided with strips of conductive material thereon adjacent each stream and connected to plated leads connected to the charging signal sources. Again, this type of electrode involves plating in several dimensions. This type of charge electrode however, is adjacent only one side of each stream and does not surround the stream, resulting in a poor charge field. Direct contact with the ink mist or splash may be avoided by applicaion of a common insulating layer, but such a coating may be subject to pin holes or defects, resulting in possible electrical shorting due to the ink.

Still another example is Culp U.S. Pat. No. 3,618,858 which discloses a dielectric bar with a series of U-shaped notches, each notch having a coating of an electrically conductive material applied to the wall to form a U-shaped channel and connected by a printed circuit lead extending from each notch to a terminal. Once again, the plating must be accomplished in several dimensions and exposes the electrodes possible shorting from the electrically conductive ink.

SUMMARY OF THE INVENTION

It is therefore an object of the present invention to provide a fluid jet charge electrode structure which may be accomplished by deposition on a single surface.

In accordance with the present invention, there is provided a stacked array of dielectric layers, each having an electrode pattern layer interposed therebetween and having an opening therethrough for the passage of a fluid or an ink jet stream. The electrode patterns may be interconnected at a distance from the openings for the fluid jet stream by the electrical interconnection within a second opening through the layers.

An advantage of the invention is that the electrode patterns may surround and be slightly spaced from the opening for the ink jet stream such that the electrodes are buried in the resultant composite laminate structure and protected from shorting by the conductive ink.

The foregoing and other objects, features and advantages of the invention will be apparent from a more particular description of a preferred embodiment of the invention as illustrated in the accompanying drawings.

DESCRIPTION OF THE PREFERRED EMBODIMENTS

Figure 1:
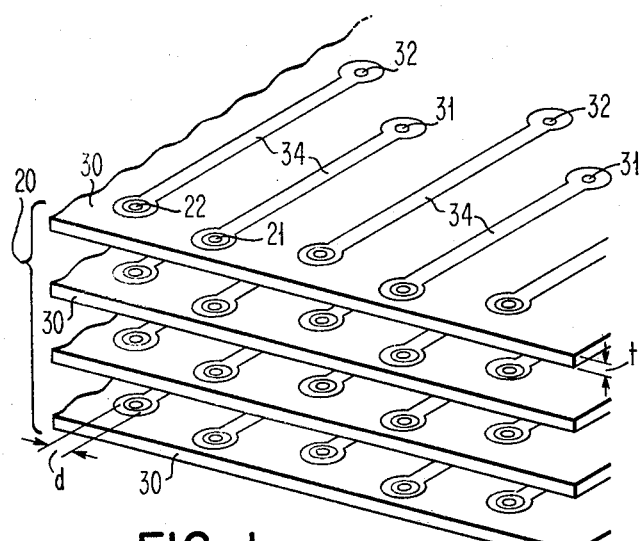
FIG. 1 is an exploded perspective view of a charge plate structure constructed in accordance with the invention.
Figure 2:
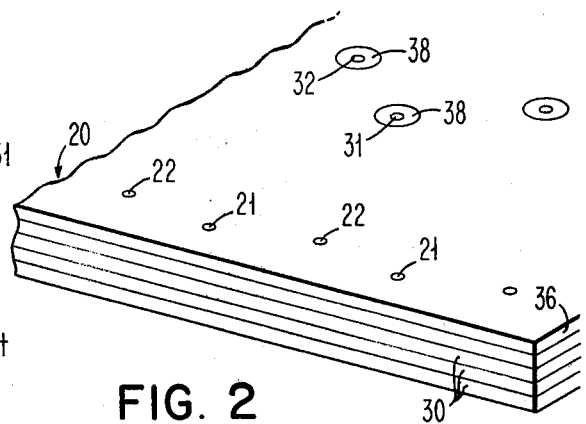
FIG. 2 is a perspective view of the assembled laminate charge plate of FIG. 1.

Referring to FIGS. 1 and 2, a charge plate 20 is illustrated for use with an electrostatic pressure ink jet assembly. The charge plate is shown with two rows of cylindrical charge tunnel openings 21 and 22 extending therethrough for passage of a corresponding plurality of fluid or ink jet streams. In accordance with the teaching of the Sweet et al. patent, above, the plurality of ink streams are generated by a fluid jet head and caused to break into streams of uniformly sized drops. The charge plate 20 is positioned a distance away from the nozzle orifices such that the ink jet stream filaments break into the streams of uniform drops within the corresponding tunnel openings 21 and 22. The drops may thus be selectively given an electrostatic charge upon breakoff and the charged drops subsequently deflected by an electrostatic deflection field to a gutter while the uncharged drops continue toward a recording medium for impingement thereon.

A specific electrostatic pressure fluid jet head assembly including apparatus for generating the fluid streams, perturbating the fluid streams to control drop breakoff, and charging, deflection and guttering means are described in the above cited co-pending patent application of Chocholaty, assigned in common with the present application.

Structure of a charge plate 20 is illustrated in FIG. 1. The charge plate may be used in the ink jet head assembly of Chocholaty.

Each of a series of dielectric sheets 30 is formed with a series of punched or cut holes 21 and 22 and another series of holes 31 and 32. Planar electrode patterns 34 are deposited on one surface of the dielectric sheet 30 by any suitable deposition process. For example, they may be directly deposited by screened deposition techniques. Alternatively, a deposition by sputtering or plating may be made with a copper or other suitable electrically conductive material over the entire face of the dielectric sheet 30, followed by a layer of a photosensitive masking material. Appropriate electrode patterns 34 may then be formed through photolithography masking techniques and subsequent etching of the unmasked coating. The mask may then be exposed and etched to the surface of the conductor to thereby leave the electrode patterns 34.

For insulating purposes, it is preferred that the electrode patterns not touch the interior of holes 21 or 22, but rather, that they be spaced from the hole by a predetermined distance. The opposite is true at holes 31 and 32, where it is necessary for the electrode patterns to contact the interior edge of the holes for subsequent electrical contact.

Several of the dielectric sheets 30 are then stacked in the same way so that no two surfaces having electrode patterns are facing one another, and are stacked so that the holes 21, 22, 31 and 32 are all concentric. The stack is then topped with a sheet 36 which may be identical to the sheets 30 and having the same holes 21, 22, 31 and 32, but having no electrode patterns.

The sheets are stacked and laminated together as illustrated in FIG. 2 to form a charge plate 20.

A preferred technique utilizes the technology described in U.S. Pat. No. 3,852,877, Junghi Ahn et al., "Multilayer Circuits," issued Dec. 10, 1974. Specifically, sheets 30 of about 7.2 mils thickness are made from a compressed slurry of an organic binder and an inorganic filler such as alumina particles, and are then punched with holes 21, 22, 31 and 32. Conductors 34 of molybdenum-silver are subsequently deposited by screening deposition. The sheets are stacked and the resultant assembly is sintered to dissipate the organic binder and to form a solid ceramic unit. The electrode pattern layers are thus brought to about a 6-mil separation and the individual identity of the sheets 30 is lost to thereby form a positive insulative seal at holes 21 and 22 and causing the conductors at holes 31 and 32 to come into contact and form interconnection cylinders 38 in FIG. 2.

Thus, the word "sheets," when used in terms of the completed assembly is defined to mean any laminar arrangement even though the individuality of the sheets may be lost through processing.

In the alternative lamination arrangements, an adhesive is placed between the sheets upon stacking and forms the positive insulative seal at holes 21 and 22. Through-hole plating may be utilized to plate the interior of holes 31 and 32 through the laminated charge plate to thereby interconnect the corresponding charge electrode patterns. The resultant through-hole plated interconnections are also designated as cylinders 38 in FIG. 2. The interconnections 38 may then be connected by suitable wires or by deposited leads to charge electrode driver circuits in accordance with the teaching of the Sweet et al. patent above.

The field uniformity and field strength in the center of the electrodes of the charge plate 20 approaches that of a conventional tubular electrode such as that of the Sweet patent, above, or that of the Beam et al. patent, above, when the interior electrode ring diameter ($d$) is greater than the axial distance ($t$) between the rings. This may alternatively be mathematically expressed as a ratio by the equation $d/t > 1$.

As an exemplary arrangement, the charge plate 20 of FIG. 2 may comprise electrode layers separated by insulative layers of about 6 mils, with holes 21 and 22 of 7-8 mils diameter, and with electrodes having a diameter ($d$) of about 10 mils.

The charge plate 20 is shown as comprising two parallel rows of charge electrodes for two corresponding rows of ink jets in accordance with the ink head of Chocholaty, above. However, the charge electrode structure may alternatively be arranged with a single row of charge electrodes, with more than two rows of charge electrodes, or may be arranged as only a single charge electrode for a single ink jet such as that of the Sweet patent, above.

Figure 3:
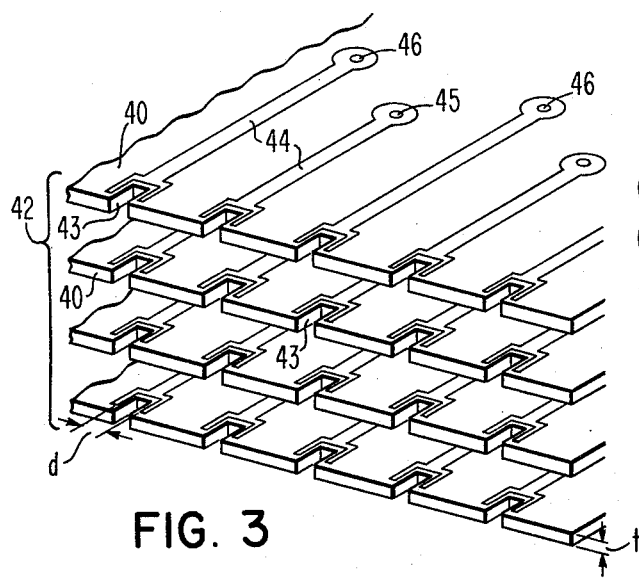
FIG. 3 is an exploded perspective view of a second charge electrode structure constructed in accordance with the invention.
Figure 4:
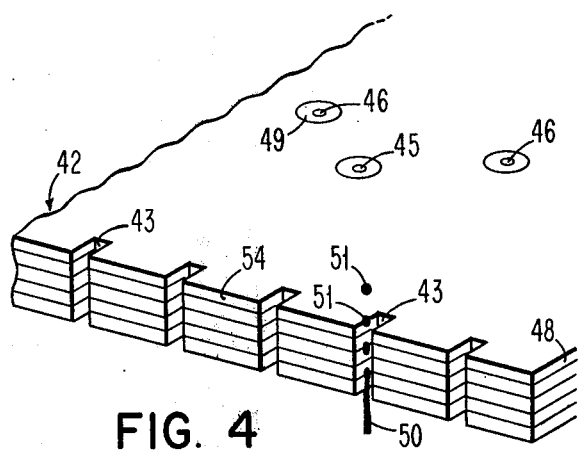
FIG. 4 is a perspective view of the assembled laminate charge plate of FIG. 3.

An alternative embodiment is shown in FIGS. 3 and 4. There, the openings in the dielectric sheets 40 forming the charge plate 42 may comprise open-sided notches 43 along and extending inwardly from one edge of each of the sheets 40. The charge electrode patterns 44 are thus formed in the shape of forks surrounding and spaced from the notches 43. The electrode patterns are formed by exactly the same techniques as described with respect to the embodiment of FIGS. 1 and 2 and similarly extend to interconnection holes 45 and 46 formed through the sheets 40. As with respect ot the charge plate of FIG. 2, the sheets 40 are stacked together with a top sheet 48 having the appropriate notches 43 and holes 45 and 46 formed therein, but without an electrode pattern. The sheets 40 and 48 are thus stacked, aligned and laminated to form the charge plate 42 in FIG. 4. The holes 45 and 46 are electrically interconnected as discussed above to form terminals for connection to the charge voltage sources.

As illustrated in FIGS. 3 and 4, notches 43 form the charge electrodes for a single row of orifices, such as shown in the Sweet et al patent, above. For the purpose of illustration, one of the ink jet streams emanating from one of the orifices, comprising filament 50 and drops 51 is shown extending through the notched charge electrodes formed by notches 43 in the charge plate 42. For a two-row ink jet head, such as shown in the Chocholaty patent above, either two charge plates 42 may be utilized, one for each row, or the notches 43 and corresponding charge patterns 44 may be alternately staggered at varying depths from edge 54 of the charge plate 42. The through-hole plating forms cylinders 49 of electrically conductive material interconnecting the charge electrode patterns 44 so that all forks for a single notch 43 receive the same charge voltage.

Figure 5:
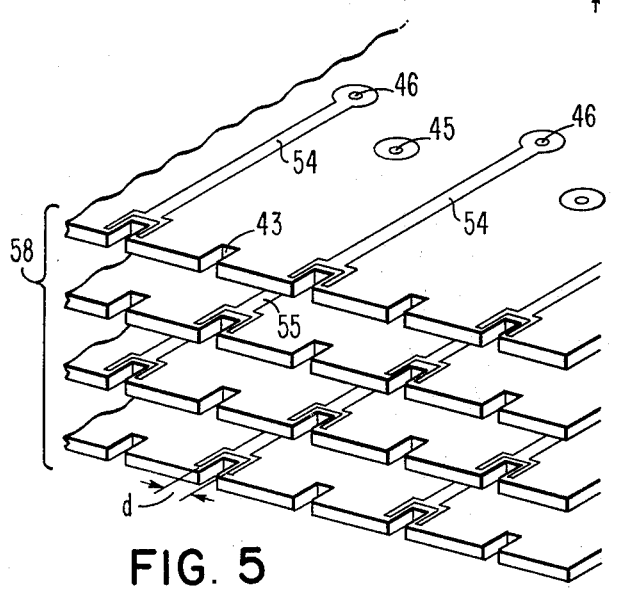
FIG. 5 is an exploded perspective view of another charge electrode structure constructed in accordance with the present invention.
Figure 6:
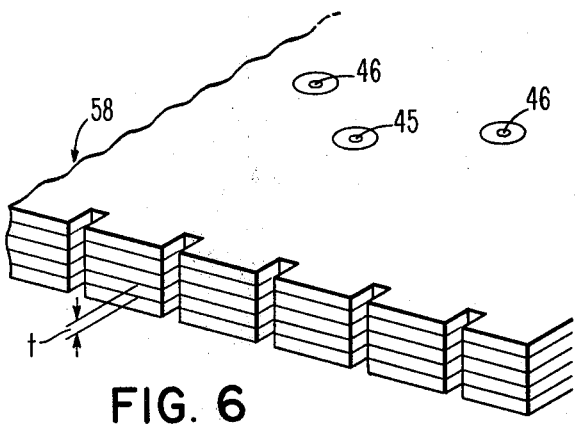
FIG. 6 is a perspective view of the assembled laminate charge plate of FIG. 5.

In concentrated arrangements where the ink jet streams are closely spaced, electrical separation may be attained by staggering the electrode patterns 54 and 55 as illustrated in FIG. 5. The notching, assembly, alignment and lamination of the charge plate is identical to that illustrated with respect to FIGS. 3 and 4 to form the resultant laminate assembly of FIG. 6. The electrodes may also be arranged in two rows with notches of varying depth as discussed above. Further, both the arrangement of FIGS. 3 and 4 and that of FIGS. 5 and 6 may be employed for more than two rows or may be employed for a single charge electrode.

The field uniformity and field strength in the center of the electrodes of the charge plate 42 or the charge plate 58 approaches that of a conventional U-shaped channel electrode such as that of the Sweet et al. patent, above, or that of the Culp patent, above, when the lateral distance ($d$) between the opposite sides of the electrode is greater than the longitudinal, or axial, distance ($t$) between two adjacent electrodes for the same jet.

In binary systems, such as described in the Sweet et al. patent, the precised level of charge may not be so important where all the charged drops are guttered. In such cases charge electrodes with somewhat nonlinear fields may be acceptable. Hence, the relationship between the lateral distance ($d$) and longitudinal distance ($t$) may be of the ratio $d/t$ slightly less than 1, for example, in the arrangement of FIGS. 5 and 6.

An advantage of this method of fabricating ink jet charge plates are that the electrodes are buried in the composite laminate and no additional passivation is required to prevent the conductive ink that may mist, splash or be deposited on the charge plate from electrically shorting the electrodes. Further, by burying the electrodes in the composite laminate, exposure to pin holes in a dielectric coating is avoided.

The charge plate may be usable in other fluid jet or mist systems employing electrostatic fluids. An example comprises binary multi-orifice ink jet printing where the uncharge drops are guttered and charged drops are deflected to the paper.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A charge electrode structure for electrostatic ink jet comprising as a stacked laminate assembly:
   a plurality of dielectric sheets, each having a coaxial opening therein for passage therethrough of an ink jet stream;
   a plurality of planar charge electrodes, interposed between certain of said dielectric sheets and disposed around said opening; and
   means electrically interconnecting said charge electrodes.

2. The charge electrode structure of claim 1 wherein:
   said plurality of charge electrodes are each additionally disposed out of contact with said opening.

3. The charge electrode structure of claim 2 wherein:
   said charge electrodes are deposited on the same surface of less than all of said plurality of dielectric sheets; and
   said dielectric sheets are arranged so that said same surfaces are disposed on the same side of said sheets in said stacked assembly and said charge electrodes are interior to said laminar assembly, and said sheets are further arranged so that said openings therein are the same size and are in coaxial alignment.

4. The charge electrode structure of claim 3 wherein:
   the lateral distance ($d$) between opposite sides of each said charge electrode is greater than the axial distance ($t$) separating adjacent charge electrodes.

5. The charge electrode structure of claim 3 wherein:
   said openings in said dielectric sheets are circular holes; and
   said charge electrodes additionally comprise planar circular rings surrounding said circular holes.

6. The charge electrode structure of claim 3 wherein:
   said openings in said dielectric sheets are U-shaped notches extending inwardly from an edge of said sheets; and
   said charge electrodes additionally comprise planar U-shaped forks disposed around said U-shaped notches.

7. A charge electrode structure for multi-orifice electrostatic ink jet comprising as a stacked laminate assembly:
   a plurality of dielectric sheets, each having a plurality of coaxial openings therein for passage therethrough of a corresponding plurality of ink jet streams;
   a plurality of planar charge electrodes interposed between certain of said dielectric sheets and disposedaround certain of said openings so that a plurality of charge electrodes are provided for each corresponding set of said coaxial openings; and
   means electrically interconnecting each set of charge electrodes for a corresponding set of said coaxial openings.

8. The charge electrode structure of claim 7 wherein:
   said plurality of charge electrodes are each additionally disposed out of contact with said corresponding opening.

9. The charge electrode structure of claim 8 wherein:
   the lateral distance ($d$) between opposite sides of each said charge electrode is greater than the axial distance ($t$) separating axially adjacent charge electrodes for a corresponding set of said coaxial openings.

10. The charge electrode structure of claim 8 wherein:

said openings in said dielectric sheets are circular holes; and said charge electrodes additionally comprise planar circular rings surrounding said circular holes.

11. The charge electrode structure of claim 8 wherein:

said openings in said dielectric sheets are U-shaped notches extending inwardly from an edge of said sheets; and said charge electrodes additionally comprise planar U-shaped forks disposed around said U-shaped notches.

12. The charge electrode structure of claim 8 wherein:

said openings are arranged in a plurality of rows, the axes of each of said coaxial openings of a common row being in parallel.

13. The charge electrode structure of claim 8 wherein:

said charge electrodes are additionally disposed around only alternate ones of said openings on each said sheet, alternate sheets having said charge electrodes disposed around said openings corresponding to those openings having electrodes omitted from adjacent sheets.

14. A layered assembly forming a charge electrode structure for electrostatic ink jet comprising:

dielectric layers having at least one opening extending completely therethrough approximatey normal to the major surfaces of said layers for passage therethrough of an ink jet stream;

charge electrode layers between said alternate dielectric layers and disposed around said opening, said charge electrode layers being of small lateral dimension and thinner than said dielectric layers; and means electrically interconnecting said charge electrode layers for said opening.

15. The layered assembly of claim 14 wherein:

said charge electrode layers are additionally disposed out of contact with said opening a sufficient distance that said adjacent dielectric layers may form a seal against penetration of ink therebetween.

16. The layered assembly of claim 15 wherein:

the lateral distance ($d$) between opposite sides of each said charge electrode across said opening is greater than the longitudinal distance ($t$) separating adjacent charge electrode layers.

17. The layered assembly of claim 15 wherein:

said alternate dielectric layers include a plurality of said openings; and each said charge electrode layer comprises separate charge electrodes for certain of said openings so that a plurality of charge electrodes are provided in a plurality of layers for each said opening.

* * * * *